US006742513B1

(12) United States Patent  (10) Patent No.: US 6,742,513 B1
Ball et al.                       (45) Date of Patent:     Jun. 1, 2004

(54) COOKING GRILLING APPARATUS AND ACCESSORIES

(76) Inventors: Thomas L. Ball, 4004 Callender Rd., Rock Creek, OH (US) 44084; Cheryl A. Ball, 4004 Callender Rd., Rock Creek, OH (US) 44084

( * ) Notice: Subject to any disclaimer, the term of this patent is extended or adjusted under 35 U.S.C. 154(b) by 11 days.

(21) Appl. No.: 09/951,900

(22) Filed: Sep. 11, 2001

(51) Int. Cl.⁷ .................................................. F24C 1/00
(52) U.S. Cl. ....................... 126/25 R; 126/9 R; 126/23
(58) Field of Search ................ 126/25 R, 9 R, 126/23, 276

(56) References Cited

U.S. PATENT DOCUMENTS

| | | | | |
|---|---|---|---|---|
| 3,611,915 A | * | 10/1971 | Glaser et al. ................. | 99/445 |
| 3,734,076 A | * | 5/1973 | Kiziol ....................... | 126/25 R |
| 3,742,838 A | * | 7/1973 | Luschen et al. .............. | 99/389 |
| 3,806,987 A | * | 4/1974 | Koziol ....................... | 16/374 |
| 5,085,890 A | | 2/1992 | Niaura et al. | |
| 5,404,795 A | | 4/1995 | Coble | |
| 5,536,518 A | * | 7/1996 | Rummel ..................... | 426/523 |
| D373,047 S | | 8/1996 | McCrary et al. | |
| 5,645,041 A | * | 7/1997 | Yu ........................... | 126/25 R |
| D402,503 S | | 12/1998 | Sanchez | |
| D418,359 S | | 1/2000 | Taylor, Jr. | |
| D421,200 S | | 2/2000 | Taylor, Jr. | |
| D424,363 S | | 5/2000 | Smith | |
| 6,189,528 B1 | * | 2/2001 | Oliver ....................... | 126/25 R |
| 6,220,149 B1 | | 4/2001 | Lin | |

* cited by examiner

Primary Examiner—Alfred Basichas
(74) Attorney, Agent, or Firm—Forrest L. Collins

(57) ABSTRACT

The present invention relates to outdoor cooking. In particular, the present invention deals with outdoor cooking grills and a display of logos on the cooking grills and related items. With the advent of professional sports teams it has become increasingly fashionable to merchandise the logos of sports teams. As consumers typically back more than one sports team the merchandise utilized by consumers often reflects the diverse nature of the sporting activities.

12 Claims, 3 Drawing Sheets

COOKING GRILLING APPARATUS AND ACCESSORIES

BACKGROUND OF THE INVENTION

1. Field of the Invention

The purpose of this invention is to provide a novel cooking grill apparatus and accouterments.

2. Description of the Art Practices

U.S. Pat. 5,085,890 issued to Niaura, et al., on Feb. 4, 1992 describes a method for preparing a flexible article comprising a substrate such as cellulose casing having thereon a desired indicia such as grill marks or a corporate logo, which in turn comprises a water soluble underlayer such as caramel and a water insoluble binder-sealant layer such as shellac. The binder-sealant covered colorant indicia is substantially completely transferable from the substrate to a contiguous edible surface such as a frankfurter, in the presence of moisture.

In U.S. Pat. No. 6,220,149 issued Apr. 24, 2001 to Lin there is described a barbeque grill structure includes a concave base, a grille-shaped framework, and a top cap. The framework defines an opening having two side walls each formed with a support step face. A material box is received in the opening and has two sides each formed with a support piece seated on the support step face. A top cover is removably mounted on the material box and defines a plurality of air vents. In such a manner, a closed chamber is defined between the framework and the top cap, and connects to the material box through the air vents.

U.S. Des. Pat. No. D418,359 to Taylor, Jr. issued Jan. 4, 2000 provides an ornamental design for a barbeque grill with baseball appearance, as shown. U.S. Des. Pat. No. D421,200 also issued to Taylor, Jr. on Feb. 29, 2000 describes an ornamental design for a barbeque grill with football appearance.

U.S. Des. Pat. No. D424,363 issued to Smith May 9, 2000 describes the ornamental design for a combined barbeque kettle grill with cart and shelves. U.S. Des. Pat. No. D402,503 issued to Sanchez on Dec. 15,1998 displays a Barbeque grill with tire tread pattern. U.S. Des. Pat. No. D373,047 issued to McCrary, et al. Aug. 27, 1996 discloses the ornamental design of a baseball helmet barbeque grill.

U.S. Pat. No. 5,404,795 issued to Coble Apr. 11, 1995 discloses a barbecue grill assembly adapted for simultaneously cooking one food and warming another, the grill comprising a base component having an upper portion and lower portion, a rearward end, a forward end, and two side walls extending between the rearward and forward ends, an opened top, and a closed bottom, the base component having a charcoal rack positioned within lower portion, the base component further having a food rack positioned above the charcoal rack; a lid component having an upper portion, a lower portion, a rearward end, a forward end, and two side walls extending between the forward and rearward ends, a closed top and an opened bottom, rack receiving means positioned upon the side walls of the lid component; an upper lid rack adapted to be received within the upper rack receiving means of the lid component; and a lower lid rack adapted to be received within the rack receiving means of the lid component, the distance between the upper lid rack and the lower lid rack being such that food items may be secured between the upper and lower lid racks, the space between the upper and lower lid racks defining a warming zone.

To the extent that the foregoing references are relevant to the present invention, they are herein specifically incorporated by reference.

SUMMARY OF THE INVENTION

The present invention deals with outdoor cooking grills and a display of logos on portions of the cooking grills. With the advent of professional sports teams it has become increasingly fashionable to merchandise the logos of sports teams.

In accordance with the invention the logos of, for example, a racing team may be removed and substituted with the logo of a professional football team.

Removable shelves for the storage of food may have the logo of one team thereon. At the end of the particular sporting season, a second shelf may be substituted for the first shelf.

The cover of the grill may have two different logos thereon. The grill cover has a hinge arrangement that permits the grill cover to be removed and reversed thus displaying the second logo.

The present invention describes a cooking grill comprising:
  a grill base;
  an upper grill cover;
  a lower grill cover;
  the said grill base supporting said lower grill cover;
  the said upper grill cover having a first side region and a second side region;
  the said upper grill cover having at least one upper grill cover hinge connecting mechanism attached to the said first side region;
  the said lower grill cover having a first side region and a second side region;
  the said lower grill cover having at least one lower grill cover hinge connecting mechanism attached to the said first side region;
  the said upper grill cover being detachably connected with the said lower grill cover by the at least one upper grill cover hinge connecting mechanism and the said at least one lower grill cover hinge connecting mechanism, for when in use, permitting the said upper grill to be opened in a first direction;
  the said upper grill cover having at least one second grill cover hinge connecting mechanism located on a side other than the first side region; and,
  the said lower grill cover having at least one second grill cover hinge connecting mechanism located on a side other than the first side region, for when in use, for receiving the said at least one second grill cover hinge connecting mechanism to permit opening of the said upper grill cover in a direction other than the first direction.

A further aspect of the present invention is a cooking grill comprising:
  a grill base;
  an upper grill cover;
  a lower grill cover;
  the said grill base supporting said lower grill cover;
  the said upper grill cover having a first side region and a second side region; and,
  the said first side region having a sports logo thereon.

Yet a further aspect of the present invention is a cover piece for an outdoor cooking grill comprising a flexible piece of material having a top surface and at least two side surfaces, the said cover piece having a sports logo or team name on at least one side surface thereof.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

With more particular reference to the drawings the following is set forth.

DETAILED DESCRIPTION OF THE INVENTION

Figure 1:
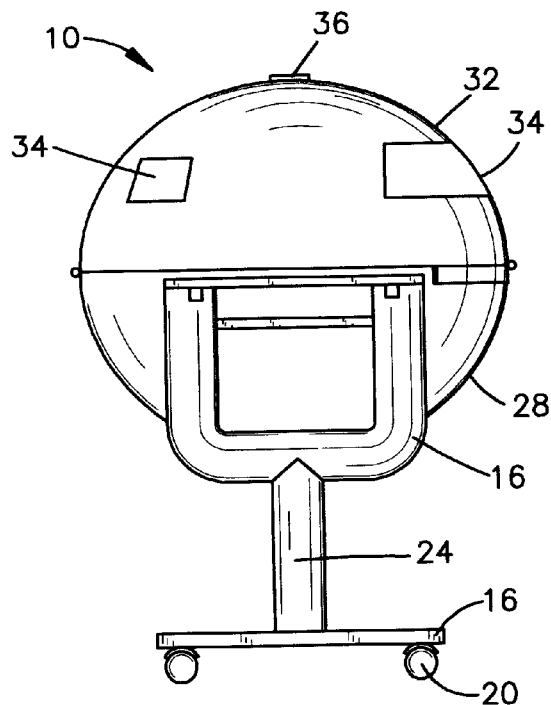
FIG. 1 shows a perspective view of an embodiment of the present invention.

As best seen in FIG. 1 is an outdoor cooking grill 10. The outdoor cooking grill 10 is comprised in part of a base portion 16. The base portion 16 may be anchored to a floor, a patio, or a deck. The anchoring of the base portion 16 of the outdoor cooking grill 10 is accomplished by a mounting mechanism 20.

The base portion 16 of the outdoor cooking grill 10 has a pedestal 24 extending vertically. The pedestal 24 connects with a lower grill cover 28. Of the lower grill cover 28 provides support therein for the grilling mechanism (not shown). The pedestal 24 is of a sufficient height above the base portion 16 to allow the cook to stand in front of the outdoor cooking grill 10 and to comfortably cook on the grilling mechanism. The pedestal 24 may be height wise adjustable to permit cooking on the grilling mechanism for a wide variety of individuals.

The outdoor cooking grill 10 has an upper grill cover 32. One or more sports logos 34 are placed on the upper grill cover 32. The upper grill cover 32 fits snugly over the lower grill cover 28. Thus, an airtight seal is obtained around the grilling mechanism if desired. The airtight seal prevents the emission of hot gas and flame except in the desired direction such as through vent 36.

Figure 2:
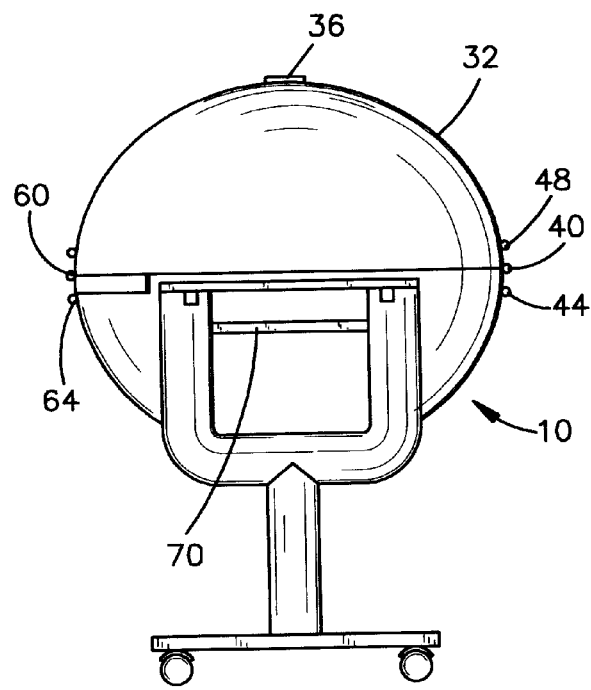
FIG. 2 shows a perspective view of an embodiment of the present invention.

As best seen in FIG. 2, is a hinge mechanism 40, which when in use permits the upper grill cover 32 to be partially raised. The hinge mechanism 40 comprises a lower hinge mechanism 44, which is fixedly connected to the lower grill cover 28. Ideally there are two lower hinge mechanisms 44 located on the lower grill cover 28.

An upper hinge mechanism 48 is fixedly connected to the upper grill cover 32. Ideally two upper hinge mechanisms 48 are employed on the upper grill cover 32.

Figure 3:
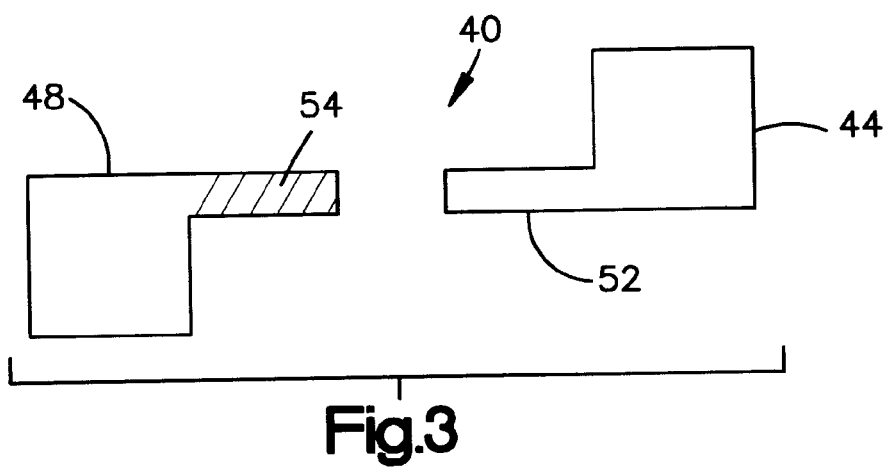
FIG. 3 is an exploded view of a hinge employed in the present invention.

In a preferred embodiment as shown in FIG. 3, the lower hinge mechanism 44 and the upper hinge mechanism 48 are the bayonet 52 and scabbard type 54. That is, a bayonet like portion of one hinge mechanism is inserted into a scabbard like receptacle. The upper grill cover 32 freely rotates from the lower grill cover 28 such that the upper grill cover 32 is stabilized to in a substantially vertical position. The upper grill cover 32 is also freely removable from the lower grill cover 28.

As best seen in FIG. 2, is a second hinge mechanism 60, which when in use also permits the upper grill cover 32 to be partially raised. The second hinge mechanism 60 is partially located on the opposite side of the lower grill cover 28. The second hinge mechanism 60 is accordingly also partially located on the opposite side of the upper grill cover 32 from the first hinge mechanism 40.

The second hinge mechanism 60 comprises a lower hinge mechanism 64, which is fixedly connected to the lower grill cover 28. Ideally two lower hinge mechanisms 64 are employed on the lower grill cover 28.

In a preferred embodiment, the lower hinge mechanism 64 is of the bayonet type. As previously discussed a bayonet like portion 52 of one hinge mechanism is inserted into a scabbard like receptacle 54. The upper grill cover 32 freely rotates from the lower grill cover 28 such that the upper grill cover 32 is stabilized to in a substantially vertical position. The upper grill cover 32 is also freely removable from the lower grill cover 28.

The second hinge mechanism 16 permits the upper grill cover 32 to be removed from its original position and rotated, for example 180 degrees, to present a different side of the upper grill cover 32.

Referring again to FIG. 2, there is shown a removable shelf 70. The removable shelf 70 is a conventional construction for use with the outdoor cooking grill 10. The removable shelf 70 may be placed on a ledge (not shown) or the removable shelf 70 may be of sliding type with suitable means affixed to the outdoor cooking grill 10 to receive the removable shelf 70.

As later discussed, the removable shelf 70 may have placed on one or both sides one or more sports logos 34. The sports logos 34 may be applied to the removable shelf 70 by imprinting, engraving, molding, or may be applied as a decal.

Figure 4:
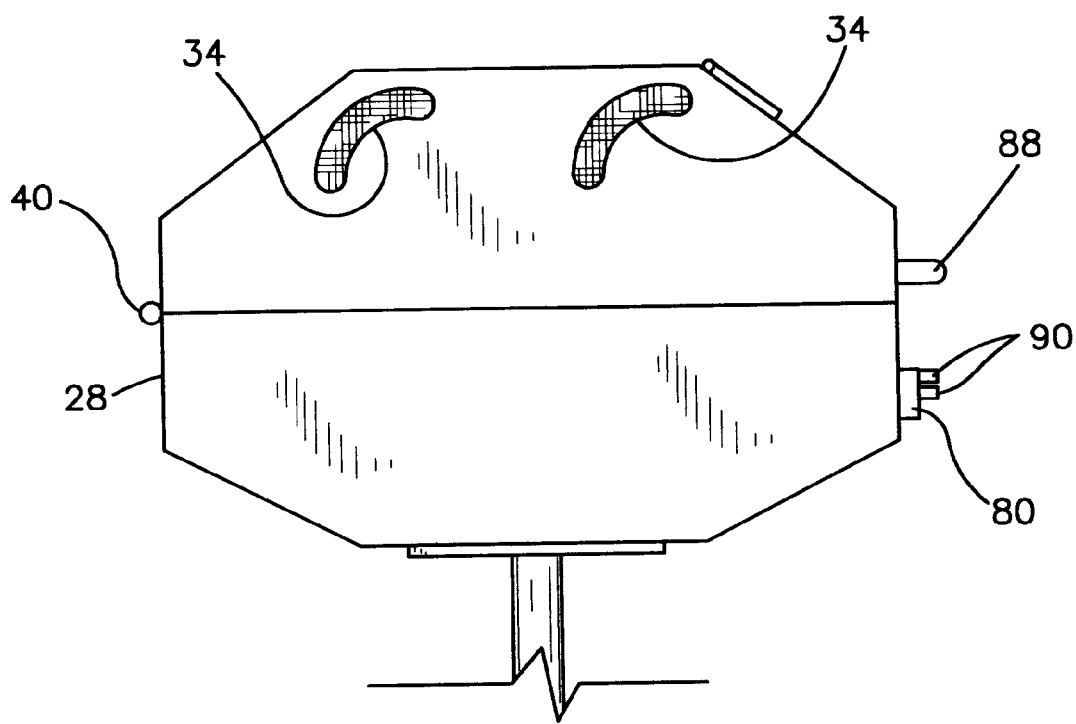
FIG. 4, a perspective view of an embodiment of the present invention.

As best seen in FIG. 4, the outdoor cooking grill 10 has a cooking control mechanism 80. In the present invention, the cooking control mechanism 80 is an optional feature. That is, the outdoor cooking grill 10 is useful either with charcoal or a flammable gas such as propane or natural gas. The flammable gas may be provided in a cylinder (not shown) or may be connected to the natural gas line supply (not shown) from a residence. In the instance where a flammable gas such as propane or natural gas is employed the cooking control mechanism 80 is employed to control the flow of the flammable gas.

The cooking control mechanism 80 for the outdoor cooking grill 10 will have one or more detachable knobs 90. The detachable knobs 90 provide a safety feature when the grill is stored outside. That is, the detachable knobs 90, when removed, will prevent children from activating the flow of the flammable gas.

The detachable knobs 90 are conveniently associated with a sporting activity. For instance, detachable knobs 90 may have a baseball motif such as miniature baseballs, miniature baseball bats, a baseball glove, a baseball helmet, and the like.

The detachable knobs 90 may also be obtained with, or as an extra purchased item, the cooking grill. Thus, during the baseball season the foregoing knobs suggested for baseball may be employed with the cooking control mechanism 80. During the football season, the detachable knobs 90 may have a football motif such as miniature footballs, a miniature goal post, and the like.

The detachable knobs 90 may also include NASCAR related items such as a gearshift knob, a miniature steering wheel, and the like. For basketball, the detachable knobs 90 may be a miniature basketball, a miniature basketball hoop, and the like.

The outdoor cooking grill 10 conveniently includes at least one handle 88. The handle 88 is advantageously located on the side of the grill on which the hinge mechanism 60 is located. As a feature of the invention is the reversible use of the upper grill cover 32 the outdoor cooking grill 10 will include at least one second handle located on the side of the upper grill cover 32 having the other hinge mechanism 60.

The handle 88 is also conveniently associated with a sporting activity. Thus for baseball, the handle 88 may have the shape of a baseball bat and the like. For football the handle 88 may have the shape of a yardage marker and the like. When the motif is NASCAR racing the handle 88 may be painted to simulate a red flag, a yellow flag, or a checkered flag, and the like.

In use, the upper grill cover 32 will have affixed thereto the logo of a sports team or sporting activity 34. Some sports logos include NASCAR, individual NASCAR drivers (vehicle colors and numbers), baseball teams such as the Cleveland Indians, football teams such as the Cleveland Browns (team colors, mascots, player identification, and items such as Dog Bones).

The upper grill cover 32 may also decorated on one side (preferably opposite the first side having the hinge mechanism 40) with the logo of the first sporting team such as the Cleveland Indians and on the opposite side (having the second hinge mechanism 60) with the team colors and number of a NASCAR driver.

The present invention thus permits and outdoor cooking grill 10 to be utilized for more than one sporting event party. As the handles 88 are detachable and the control knobs 90 are detachable the entire sporting team may be reemphasized with the grill. An added feature of present invention is a flexible cover (not shown) which may be used to protect the outdoor cooking grill from the elements. The flexible cover may be employed utilizing a first team logo or may be reversible having a second logo of another team which was does not show when the first logo is employed. Alternatively, the flexible cover may have different sporting themes on different sides of the flexible cover.

The removable shelves as previously discussed may be coordinated with the sporting team evidenced on the upper grill cover 32. The removable shelves may also be coordinated with the grill control knobs 90.

As the present invention employs more than one hinge mechanism such as hinge mechanism 40 and hinge mechanism 60 the installation of the grill may be simplified because the outdoor cooking grill 10 may be assembled without regard to which side is against a wall or deck railing. That is, if the grill is permanently affixed to a deck it may otherwise not be possible to place the upper grill cover 32 on the lower grill cover 28. The bayonet 52 of the upper hinge mechanism 48 engages either the scabbard 54 of the lower hinge mechanism 44 of the lower grill cover 28 or the lower hinge mechanism 64 of the lower grill cover 28.

Figure 5:
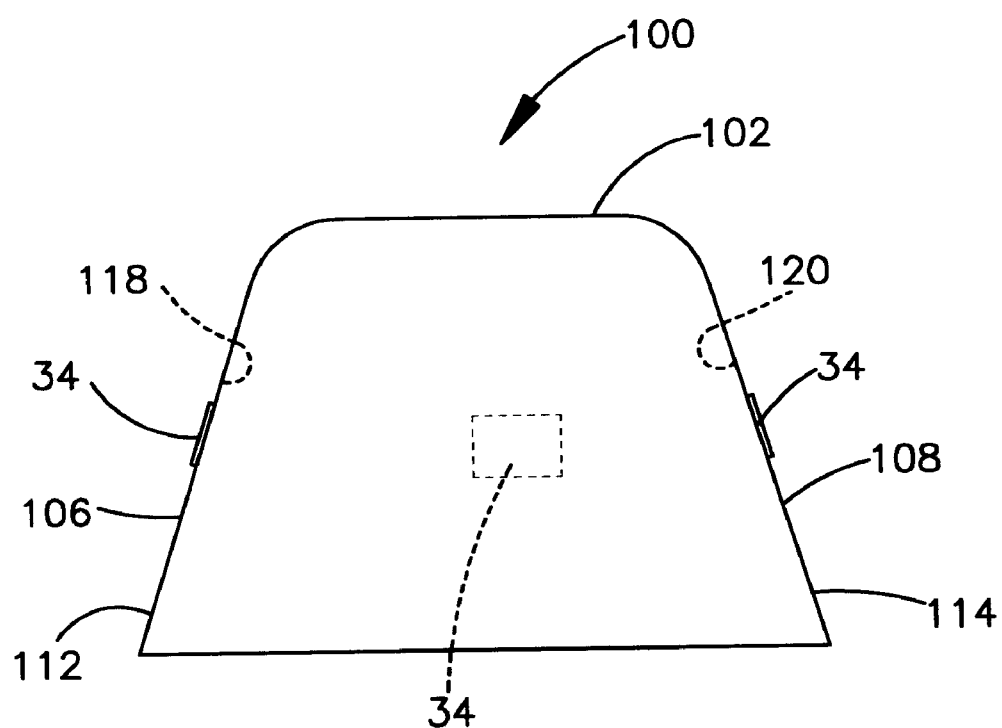
FIG. 5, shows a perspective view of an embodiment of the present invention.

The present invention also describes a cover piece 100 as seen in FIG. 5 for an outdoor cooking grill comprising a flexible piece of material having a top surface 102 and at least two side surfaces 106 and 108. The surfaces 106 and 108 each have exterior surfaces 112 and 114 respectively. The surfaces 106 and 108 each have interior surfaces 118 and 120 respectively. The cover piece 100 has a sports logo or team name on at one least exterior surface thereof or at least one interior surface thereof.

No claim is made to the exclusive use of any team name or sporting association name, or trademark, or service mark, or certification mark or collective mark referred to herein other than the rights conferred by the grant of this patent.

From the above description of the invention, those skilled in the art will perceive improvements, changes and modifications. Such improvements, changes and modifications within the skill of the art are intended to be covered by the appended claims.

What is claimed is:

1. A cooking grill comprising:
   a grill base;
   a single reversible upper grill cover;
   a lower grill cover;
   said grill base supporting said lower grill cover;
   said single reversible upper grill cover having a first side region and a second side region;
   said single reversible upper grill cover having at least one upper grill cover hinge connecting mechanism attached to said first side region;
   said lower grill cover having a first side region and a second side region;
   said lower grill cover having at least one lower grill cover hinge connecting mechanism attached to said first side region;
   said single reversible upper grill cover being detachably connected with said lower grill cover by the at least one upper grill cover hinge connecting mechanism and said at least one lower grill cover hinge connecting mechanism, for when in use, permitting said single reversible upper grill to be opened in a first direction;
   said single reversible upper grill cover having at least one second grill cover hinge connecting mechanism located on a side other than the first side region; and,
   said lower grill cover having at least one second grill cover hinge connecting mechanism located on a side other than the first side region, for when in use, for receiving said at least one second grill cover hinge connecting mechanism to permit opening of said single reversible upper grill cover in a direction other than the first direction.

2. The cooking grill according to claim 1, wherein said grill base has located thereon at least one external removable shelf.

3. The cooking grill according to claim 1, wherein said single reversible upper grill cover has a first logo on said first side region and a second logo on said second side region.

4. The cooking grill according to claim 2, wherein said grill base has located thereon at least one external removable shelf wherein said one external removable shelf has located on one side thereof at least one logo associated with said first logo.

5. The cooking grill according to claim 4, wherein the grill base has located thereon at least one external removable shelf wherein said one external removable shelf has located on one side thereof at least one logo associated with said first logo and on a second side of said one external removable shelf at least one logo associated with said second logo.

6. The cooking grill according to claim 5, wherein said first logo is connected with a sporting activity.

7. The cooking grill according to claim 5, wherein said first logo and said second logo are both connected with sporting teams.

8. The cooking grill according to claim 1, wherein a cooking control mechanism is affixed to said lower grill cover and that said the cooking control mechanism has at least one detachable control knob.

9. The cooking grill according to claim 8, wherein the at least one detachable control knob is associated with a sporting activity.

10. The cooking grill according to claim 5, wherein a cooking control mechanism is affixed to said lower grill cover and that said the cooking control mechanism has at least one detachable control wherein the at least one detachable control knob is associated with the same sporting activity as said first logo.

11. The cooking grill according to claim 1, wherein said cooking grill has at least one handle and said handle is associated with a sporting activity.

12. The cooking grill according to claim 5, wherein said cooking grill has at least one handle and said handle is associated with the same sporting activity as said first logo.

* * * * *